United States Patent [19]

Okoroafor et al.

[11] Patent Number: 5,691,392

[45] Date of Patent: Nov. 25, 1997

[54] STABLE PARTICULATE DISPERSIONS

[75] Inventors: Michael O. Okoroafor, Export; William H. McDonald, Cranberry Township, both of Pa.; Alan E. Wang, Hoffman Estates, Ill.

[73] Assignee: PPG Industries, Inc., Pittsburgh, Pa.

[21] Appl. No.: 795,736

[22] Filed: Feb. 5, 1997

[51] Int. Cl.$^6$ .................................................. C08G 18/00
[52] U.S. Cl. ........................... 521/112; 521/114; 521/116; 521/117; 521/122; 521/130
[58] Field of Search ............................. 521/112, 122, 521/130, 114, 117, 116

[56] References Cited

U.S. PATENT DOCUMENTS

| | | | |
|---|---|---|---|
| 3,001,973 | 9/1961 | Plepenbrink et al. | 260/75 |
| 3,124,605 | 3/1964 | Wagner | 260/453 |
| 3,152,162 | 10/1964 | Fischer et al. | 260/453 |
| 3,394,164 | 7/1968 | McClellan et al. | 260/453 |
| 3,401,180 | 9/1968 | Pan et al. | 260/397.4 |
| 3,454,606 | 7/1969 | Brotherton et al. | 260/397.7 |
| 3,492,330 | 1/1970 | Trecker et al. | 260/453 |
| 4,065,410 | 12/1977 | Schäfer et al. | 260/2.5 AM |
| 4,217,422 | 8/1980 | Wasilczyk | 521/122 |
| 4,751,251 | 6/1988 | Thomsberry | 521/112 |
| 4,795,763 | 1/1989 | Gluck et al. | 521/99 |
| 5,137,927 | 8/1992 | Wolff et al. | 521/54 |
| 5,308,881 | 5/1994 | Londrigan et al. | 521/112 |
| 5,308,883 | 5/1994 | Londrigan et al. | 521/125 |
| 5,312,848 | 5/1994 | Klapper et al. | 521/172 |

FOREIGN PATENT DOCUMENTS

WO96/00750   1/1996   WIPO.

OTHER PUBLICATIONS

M. Okoroafor, et al "Rigid Polyurethane Foams With Enhanced Thermal Insulation Performance", Polyurethanes 1995, Proceedings of the Polyurethanes 1995 Conference, pp. 303–309.

*Primary Examiner*—Morton Foelak
*Attorney, Agent, or Firm*—Irwin M. Stein

[57] ABSTRACT

A composition comprising a particulate dispersion of from 50% to 98.9% by weight of a siloxane-polyoxyalkylene copolymer surfactant, from 1% to 49.9% by weight of a nonionic organic surfactant other than the siloxane-polyoxyalkylene copolymer surfactant and from 0.1% to 25% by weight, based on the total weight of the composition, of a particulate material having a particle size of less than 20 microns, is described. A method of preparing such a composition, and polyurethane and polyisocyanurate foams containing such a composition are also described. The nonionic organic surfactant is preferably an ethoxylated nonylphenol. The particulate material is preferably a hydrophobic precipitated silica. The composition of the invention is useful as an additive in the preparation of rigid polyurethane and polyisocyanurate foams.

11 Claims, No Drawings

STABLE PARTICULATE DISPERSIONS

DESCRIPTION OF THE INVENTION

The present invention relates to a stable particulate dispersion, to a method of preparing such particulate dispersion, and to polyurethane and polyisocyanurate foams prepared in part with such particulate dispersion. Particularly, the present invention relates to a stable particulate dispersion comprising a siloxane-polyoxyalkylene copolymer surfactant, a nonionic organic surfactant and a particulate material having a particle size of less than 20 microns. More particularly, the present invention relates to the aforedescribed stable particulate dispersion wherein the particulate material is silica.

Silicone surfactants, e.g., siloxane-polyoxyalkylene block copolymers, are used as surfactants in rigid polyurethane foam formulations to facilitate foam formation. See, for example, U.S. Pat. No. 4,751,251. It has been proposed that silica, e.g., silica aerogel, be added to rigid polyurethane foam formulations to enhance the insulating properties of such foams when fluorocarbon blowing agents are not used. See, International Patent Publication WO 96/00750. Such enhancement has been suggested to be due to a reduction in the average cell size which is concurrent with a narrowing of the cell size distribution of the rigid polyurethane foams. A more detailed discussion of this topic can be found in the paper, "Rigid Polyurethane Foams with Enhanced Thermal Insulation Performance", by Okoroafor et al, published in *POLYURETHANE* 1995, Proceedings of the Polyurethanes, 1995 Conference, pp. 303–309.

U.S. Pat. No. 4,795,763 discloses polymer foams containing as filler at least about 2 percent by weight of carbon black, based on the weight of the polymer in the foam. A process for producing a carbon black-filled, closed cell, rigid, polymer foam, which comprises in part providing a dispersion of carbon black in a polymer foam-forming composition containing a foaming agent is disclosed in the '763 patent. See, for example, column 4, lines 58 and 59, of the patent.

U.S. Pat. No. 4,751,251 discloses a surfactant composition for rigid urethane foam, including isocyanurate foams, which includes from about 15 to about 50% each of the following ingredients: (1) an organic surfactant; (2) a siloxane-polyoxyalkylene surfactant; and (3) one of water, C-1 to C-3 alcohol and mixtures thereof.

While the patent publication WO 96/00750 discloses the combination of a siloxane-polyoxyalkylene copolymer surfactant with a viscosity modifying agent, it does not disclose particulate dispersions or stable particulate dispersions of siloxane-polyoxyalkylene copolymer surfactant, nonionic organic surfactant and particulate material, e.g., silica.

It has been observed in our studies that a mixture of siloxane-polyoxyalkylene copolymer surfactant and particulate material, such as silica, is physically unstable, i.e., the silica agglomerates and settles out of the mixture. This instability requires that such mixtures be prepared just prior to mixing with the foam-forming formulation, or that the silica and siloxane-polyoxyalkylene surfactant be added separately to the foam-forming components. The use of a mixture of siloxane-polyoxyalkylene surfactant and silica wherein the silica in the mixture has agglomerated leads to problems in rigid polyurethane foam manufacture, such as poor foam formation due to, e.g., the disruption of cell wall network formation, and the clogging or fouling of the impingement mixing head typically used in rigid polyurethane foam manufacture.

In the manufacture of foams, e.g., polyurethane foams, and in particular rigid polyurethane foams, it is typically impractical to mix together the siloxane-polyoxyalkylene copolymer surfactant and particulate material just prior to their use. Such a requirement requires extra time, energy, the use of additional equipment, and is not cost effective. Consequently, there is a need for preformed mixtures of siloxane-polyoxyalkylene copolymer surfactant and particulate material, which are physically stable and that can be stored for and used over an extended period of time after their preparation, for use in the process of preparing polyurethane foams, e.g., rigid polyurethane foams.

It has now been discovered that physically stable particulate dispersions of siloxane-polyoxyalkylene copolymer surfactant and particulate material, e.g., silica, can be prepared, and that such preformed dispersions can be used to prepare polyurethane foams, e.g., rigid polyurethane foams. By "stable particulate dispersion" is meant a dispersion of a solid particulate material(s), e.g., a silica such as precipitated silica or silica aerogel, in a liquid medium (continuous phase) wherein the particulate material(s) does not agglomerate and/or settle within a period of three months from the date of preparation.

In accordance with the present invention, there is provided a composition comprising a stable particulate dispersion of: from 50% to 98.9% by weight, based on the total weight of said composition, of a siloxane-polyoxyalkylene copolymer surfactant; from 1% to 49.9% by weight, based on the total weight of said composition, of a nonionic organic surfactant other than the siloxane-polyoxyalkylene copolymer surfactant; and from 0.1% to 25% by weight, based on the total weight of said composition, of a particulate material having a particle size of less than 20 microns.

Other than in the operating examples, or where otherwise indicated, all numbers expressing quantities of ingredients or reaction conditions used in the specification and claims are to be understood as modified in all instances by the term "about". Unless otherwise noted, as used herein molecular weights are number average molecular weights in units of gram/mole as determined by gel permeation chromatography using polystyrene standards.

DETAILED DESCRIPTION OF THE INVENTION

The siloxane-polyoxyalkylene copolymer surfactant useful in the practice of the present invention is preferably present in an amount of from 50% to 80% by weight and more preferably from 65% to 80% by weight, based on the total weight of the particulate dispersion. Any appropriate siloxane-polyoxyalkylene copolymer surfactant used in the preparation of polyurethane or polyisocyanurate foams may be employed in the practice of the present invention. Examples of useful siloxane-polyoxyalkylene copolymer surfactants include, but are not limited to, polydimethylsiloxane-polyoxyalkylene block copolymers available from: OSi Chemicals Incorporated under the designations "Y-10222", "L-5420" and "L-5340"; Dow Corning Corporation under the designations "DC-193", "DC-5357" and "DC-5315"; and Goldschmidt Chemical Corporation under the designations "B-8404" and "B-8407".

In the practice of the present invention, a preferred siloxane-polyoxyalkylene copolymer surfactant is represented by the following general formula I,

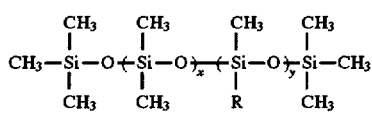

wherein x is a number of from 1 to 150, y is a number of from 1 to 50, the ratio of x:y is from 10:1 to 1:1 and R is an alkyl alkoxylate. With reference to general formula I, x is preferably from 10 to 50, more preferably from 10 to 42, especially 13 to 42; and y is preferably from 2 to 20, more preferably 5 to 20, especially 7 to 20, and particularly 7 to 10. The ratio of x:y in general formula I is preferably between 2.4 and 6.8.

In general formula I, R is an alkyl alkoxylate which can be represented by the following general formula II:

$$R'O(C_2H_4O)_m(C_3H_6O)_nH \qquad \text{II}$$

wherein R' is an alkylene group containing from 3 to 6 carbon atoms, m is a number of from 5 to 200, and n is a number of from 0 to 20, preferably from 2 to 18. The molecular weight of R is in the range of 400 to 4000, and the molecular weight of the surfactant represented by general formula I is typically from 6000 to 50,000.

The siloxane-polyoxyalkylene copolymer surfactant can be prepared by equilibrating hexamethyldisiloxane, octamethyl cyclotetrasiloxane, and a polymethylhydrogensiloxane to form a silicone fluid intermediate, which equilibration process can be represented by the following General Scheme I:

General Scheme I

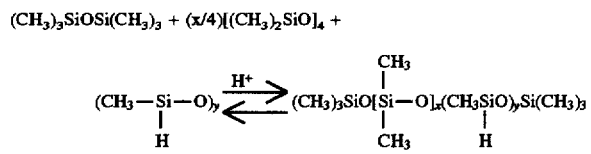

wherein y is generally in the range of from 2 to 20. The value of x varies broadly depending on the desired application, and will typically be from 1 to 150. In General Scheme I, "H⁺" is representative of an acid catalyst. A preferred acid catalyst in the equilibration reaction illustrated in General Scheme I is trifluoromethane sulfonic acid. The resulting silicone fluid is a very stable, reproducible intermediate, which may be represented as $MD_xD'_yM$, where M is methyl, D is the dimethlysiloxane segment and D' is the methylhydrogensiloxane segment. The silicone fluid intermediate then undergoes a hydrosilylation reaction with an unsaturated alkyl alkoxylate such as an allyl polyether, as represented in the following general scheme II:

General Scheme II

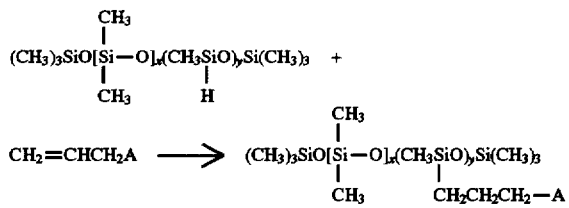

The product shown in General Scheme II may be represented by $MD_xD^*_yM$, wherein M, D, x and y are as defined hereinbefore. The letter x is preferably from 10 to 50, more preferably from 10 to 42, especially from 13 to 42; y may be 0, but is preferably from 1 to 50, more preferably from 2 to 20, still more preferably from 5 to 20, especially from 7 to 20, and particularly from 7 to 10; the ratio of x to y may be from 10:1 to 1:1 and is preferably between 2.4 and 6.8; D* is the methylalkylalkoxysiloxane segment wherein the alkyl preferably comprises 3 to 6 carbon atoms and A is an alkoxylate group represented by the following general formula III, $$-O(C_2H_4O)_m(C_3H_6O)_nH \qquad \text{III}$$

wherein n may be from 0 to 20 and is preferably from 2 to 18, and m is from 5 to 200. A preferred allyl polyether has a random distribution of from 65 to 100 weight percent, preferably from 70 to 90 weight percent, ethoxy groups; up to 35 weight percent, preferably from 10 to 30 weight percent, propoxy groups; and a molecular weight of from 400 to 4000, preferably from 400 to 1500, and more preferably from 700 to 1300.

For compatibility with particulate materials, the siloxane-polyoxyalkylene copolymer surfactant of the present invention is best characterized by its molecular weight, its functionality, the polyoxyalkylene pendant molecular weight and the ethoxy/propoxy group ratio in the pendent polyoxyalkylene. The siloxane-polyoxyalkylene copolymer surfactant molecular weight is preferably in the range of from 9000 to 50,000, and more preferably from 6000 to 12,000. Siloxane-polyoxyalkylene copolymer surfactant functionality is characterized by the proportion of polyoxyalkylene pendent groups to siloxane backbone, polyoxyalkylene molecular weight and the proportion of ethoxy/propoxy groups, which determine surfactant activity of the particulate dispersions of the present invention. The functionality of the siloxane-polyoxyalkylene copolymer surfactant is more hydrophilic with a greater proportion of polyoxyalkylene, lower pendent molecular weight and higher ethoxy proportion. The functionality of the siloxane-polyoxyalkylene copolymer surfactant is more hydrophobic with a lower proportion of polyoxyalkylene groups, higher molecular weight of the pendent group and lower ratio of ethoxy/propoxy groups.

The pendent polyoxyalkylene molecular weight is preferably in the range of 400 to 4000, more preferably in the range of 400 to 1500, and most preferably in the range of 700 to 1300. The ethoxy/propoxy distribution is preferably from 65 to 100 weight percent, and more preferably from 70 to 90 weight percent ethoxy moiety. The pendent polyoxyalkylene group may contain up to 35 weight percent, preferably from 10 to 30, weight percent propoxy moiety, with the propoxy moiety preferably being randomly distributed.

The composition of the present invention comprises also preferably from 1% to 25% by weight, and more preferably from 15% to 25% by weight, based on the total weight of the composition, of a nonionic organic surfactant or mixture of nonionic organic surfactants. By nonionic organic surfactant is meant a nonionic organic surfactant other than the siloxane-polyoxyalkylene copolymer surfactant. Any nonionic organic surfactant which produces a stable dispersion of the particulate material in the siloxane-polyoxyalkylene copolymer surfactant can be used in the practice of the present invention. In a preferred embodiment of the present invention, a predispersion of the particulate material in the nonionic organic surfactant is first formed followed by mixing of the predispersion with the siloxane-polyoxyalkylene copolymer surfactant, thereby preparing a stable particulate dispersion.

Classes of nonionic organic surfactants that may be used in the practice of the present invention include, but are not limited to: alkanolamides, such as coconut diethanolamide, oleic diethanolamide, lauric diethanolamide, lauric monomethanolamide, and stearic diethanolamide; polyalkylene oxides, such as polyethylene oxides, polypropylene oxides, and ethylene oxide-propylene oxide copolymers; alkoxylated allyl alcohols, such as ethoxylated allyl alcohols, propoxylated allyl alcohols, ethoxylated and propoxylated allyl alcohols, acetoxy capped ethoxylated or propoxylated or ethoxylated and propoxylated allyl alcohols; alkoxylated alkylphenols, such as ethoxylated octylphenols, and ethoxylated nonylphenols; alkoxylated monofunctional alcohols, such as ethoxylated tridecyl alcohols; alkoxylated fatty acids, such as ethoxylated oleic acid, and ethoxylated stearic acid; alkoxylated fatty acid esters, such as ethoxylated castor oils, ethoxylated hydrogenated castor oils, and ethoxylated sorbitol fatty acid esters; and glycol esters, such as ethylene glycol distearate, ethylene glycol monostearate, and propylene glycol distearate.

Preferred nonionic organic surfactants useful in the practice of the present invention are selected from at least one of the group consisting of alkoxylated alkylphenols, polyalkylene oxides, and alkoxylated allyl alcohols. Alkoxylated alkylphenols, in particular ethoxylated nonylphenols, are more preferred. Particularly preferred ethoxylated nonylphenols are those having from 1 to 30, preferably 2 to 20 and more preferably from 5 to 15 ethoxy units.

Stable particulate dispersions according to the present invention may also include a viscosity reducing agent or mixture of such agents. The viscosity reducing agent is present in an amount effective to reduce the viscosity of the stable particulate dispersions of the present invention to within a workable range, e.g., from 250 to 2500 centipoise (cps), preferably from 400 to 1800 cps, and more preferably from 600 to 1200 cps, at 25° C. If a viscosity reducing agent is used, it is typically present in an amount of from 1% to 50% by weight, preferably from 5% to 25% by weight, and more preferably from 5% to 15% by weight, based on the total weight of the nonionic organic surfactant.

In the method of the present invention, the viscosity reducing agent may be present during the formation of the predispersion, or added to the predispersion after its formation, or added during the mixing of the predispersion with the siloxane-polyoxyalkylene copolymer surfactant. If used, it is preferred that the viscosity reducing agent be added during the mixing of the predispersion with the siloxane-polyoxyalkylene copolymer surfactant.

Preferred viscosity reducing agents are low viscosity liquid compounds having viscosity's of less than 200 cps, and preferably less than 100 cps, at 25° C. Viscosity reducing agents useful in the practice of the present invention include organic compounds which contain, methoxy, ethoxy, carboxylate or carbonate groups. Specific examples of viscosity reducing agents include, but are not limited to: propylene carbonate; 2-methoxyethyl ether; dipropylene glycol, methyl ether; triethylene glycol, dimethyl ether; triethylene glycol, monomethyl ether; tripropylene glycol, monomethyl ether; methyl-2,5-dihydro-2,5-methoxy-2-furancarboxylate; 1-methoxy-2-methylpropylene oxide; 2-methoxy ethyl acetoacetonate; diethylene glycol, monomethyl ether, 2-methoxy-1,3-dioxolane; methoxyacetone; methoxyacetaldehyde, dimethylacetal; methoxyacetaldehyde diethyl acetal; 2,5-dimethoxy tetrahydrofuran; 2,5-dimethoxy-3-tetrahydrofurano carboxaldehyde; 2,2-dimethoxy propane; 1,2-dimethoxy propane and dimethoxy methane. Examples of preferred viscosity reducing agents include: propylene carbonate; 2-methoxy ethyl ether; and dipropylene glycol, methyl ether. Preferred viscosity reducing agents are selected from the group consisting of propylene carbonate, 2-methoxy ethyl ether, dipropylene glycol methyl ether, and mixtures thereof.

When the stable particulate dispersions of the present invention are used as additives in the formulation of foams, in particular polyurethane and polyisocyanurate foams, it is preferred that the viscosity reducing agent contain carbonate or carboxylate groups. A particularly preferred viscosity reducing agent is propylene carbonate.

The composition of the present invention comprises also preferably from 0.1% to 10% by weight, and more preferably from 0.1% to 5% by weight, based on the total weight of the composition, of a particulate material having a particle size of less than 20 microns, preferably less than 10 microns and more preferably less than 5 microns. As used herein, unless otherwise noted, particle sizes are mean particle sizes calculated from gaussian distributions, and are determined using a particle size analyzer, e.g., a Coulter LS particle size analyzer. It should be understood that the practice of the present invention allows for the presence, in small amounts, of particulate materials having particle sizes outside of these ranges so long as such larger particles do not adversely affect the function of the particulate materials in the foam, i.e., an enhancement of the foam's thermal insulation.

In the formation of a stable particulate dispersion according to the present invention, a particulate material having an initial particle size of greater than 20 microns may be used. For example, silica having an initial particle size in the range of 20 to 50 microns may be used, if in the process of forming the stable particulate dispersion the silica particle size is reduced to a final particle size of less than 20 microns. By initial and final particle size is meant, respectively, the particle size of the particulate material prior to and after the formation of the predispersion.

Classes of particulate materials useful in the practice of the present invention include, but are not limited to: titanium dioxide; carbon blacks in fluffy or pelleted form such as lampblacks, channel blacks, gas furnace blacks, oil furnace blacks and thermal blacks; sulfates such as, calcium sulfate and barium sulfate; carbonates such as calcium carbonate; metal oxides such as iron oxide; talc; mica; and silicas such as precipitated silicas, fumed silicas, silica aerogels, hydrophobic silicas, and hydrophilic silicas.

The choice of which class of particulate material is used will depend in part on the nature of the application in which the stable particulate dispersions of the present invention are used. For example, when the stable particulate dispersions of the present invention are used as additives to enhance the thermal insulation performance of foams, in particular polyurethane foams, and more particularly rigid polyurethane foams, the preferred particulate material is silica. Classes of silica that may be used include, for example, silica aerogels, fumed silicas, precipitated silicas, and in particular hydrophobic and hydrophilic precipitated silicas. Preferred particulate materials may be selected from the group consisting of fumed silica, precipitated silica, silica aerogel, and mixtures of such silicas.

A particularly preferred class of silica is precipitated silica. While both hydrophobic and hydrophilic precipitated silicas may be used in the practice of the present invention, hydrophobic precipitated silicas are preferred. Hydrophobic precipitated silicas are typically prepared by hydrophobizing a hydrophilic precipitated silica with hexamethyldisilazane (HMDZ), or trimethoxymethylsilane (TMMS). An example of a preferred hydrophobic precipitated silica is prepared by hydrophobizing Hi-Sil® 2000 silica, a hydrophilic precipitated silica available from PPG Industries Incorporated (PPG), with HMDZ using standard techniques well known to those skilled in the art.

In an embodiment of the present invention, a predispersion of from 0.2% to 30% by weight, preferably from 5% to 25% by weight, and more preferably from 10% to 15% by weight based on the total weight of the predispersion, of a particulate material, and from 70% to 99.8% by weight, preferably from 75% to 95% by weight, and more preferably from 85% to 90% by weight, based on the total weight of the predispersion, of a nonionic organic surfactant is first formed. The predispersion may be formed by any appropriate means. Such dispersing means include, but are not limited to, the use of high speed impellers, high speed cowles blades, ball mills, media mills such as sand mills, ultrasonication, and microfluidizion. The type of method employed in the formation of the predispersion will depend in part on the initial particle size of the particulate material used and the final particle size desired. For example, if a particulate material having an initial particle size of greater than 20 microns, e.g., 20 to 50 microns, is used, the dispersing means will be sufficiently energy intensive to reduce the initial particle size of the particulate to a final particle size of less than 20 microns, preferably less than 10 microns, and more preferably less than 5 microns. Optionally, from 1% to 50% by weight, based on the weight of the nonionic organic surfactant, of a viscosity reducing agent may also be present in the predispersion during its formation, or added to the predispersion after its formation, or added during the mixing of the predispersion with the siloxane-polyoxyalkylene copolymer surfactant.

The predispersion is subsequently mixed with a siloxane-polyoxyalkylene copolymer surfactant, such that a composition having from 50% to 98.9% by weight, based on the total weight of the composition, of the siloxane-polyoxyalkylene copolymer surfactant is prepared. The mixing of the predispersion with the siloxane-polyoxyalkylene copolymer surfactant may be achieved by any appropriate means. Such means of mixing are generally not required to be as energy intensive as those used in forming the predispersion, and typically include, but are not limited to, the use of a medium to high speed impeller or cowles blade. Compositions of stable particulate dispersions prepared in accordance with the aforedescribed method have good physical stability.

The present invention relates also to polyurethane and polyisocyanurate foams comprising respectively, a polyurethane or a polyisocyanurate network of cell walls surrounding interstitial spaces wherein the cell network is formed by reacting polyisocyanate and polyol in the presence of the stable particulate dispersion described herein.

Polyurethane and polyisocyanurate foams can be prepared by employing standard techniques known to those skilled in the art. Such techniques fundamentally involve polymerizing and foaming a polyisocyanate with a polyol in the presence of a blowing agent and additives such as catalysts. Depending on the type(s) of catalyst and ratio of reactants used, the resulting foam will have predominantly, a polyurethane network, or a polyisocyanurate network, or a combination of both polyurethane and poylyisocyanurate network of cell walls surrounding interstitial spaces. The molar ratio of isocyanate (NCO) groups to hydroxyl groups in the foam-forming components is typically in the range of 1:1 to 10:1 or higher, and, as is known to those skilled in the art, will be more narrowly adjusted depending on the type of foam network prepared. The polyurethane and polyisocyanurate foams of the present invention are prepared by carrying out the aforedescribed known technique in the presence of the stable particulate dispersion of the present invention, which dispersion may be added to either the polyisocyanate component or the polyol component or both prior to foam formation. It is preferable that the composition of the present invention be added to the polyol component prior to foam formation.

Polyurethane and polyisocyanurate foams according to the present invention result from foam formulations having present therein from 0.1% to 5% by weight, preferably from 0.2% to 3% by weight, and more preferably from 0.4% to 1.6% by weight, based on the total weight of the foam formulation, of the stable particulate dispersion of the present invention.

Any of the polyisocyanates known to be useful in the preparation of polyurethane and polyisocyanurate foams may be employed in the present invention. By polyisocyanate is meant an isocyanate having two or more isocyanate groups per molecule. Classes of such polyisocyanates include, for example, aliphatic, cycloaliphatic, aromatic and heterocyclic polyisocyanates, polymeric polyisocyanates and combinations thereof. Specific examples of polyisocyanates include those described in U.S. Pat. Nos. 5,312,848, 4,795,763, 4,065,410, 3,401,180, 3,454,606, 3,152,162, 3,492,330, 3,001,973, 3,394,164 and 3,124,605, all of which examples are incorporated herein by reference. Examples of preferred polyisocyanates include: aromatic diisocyanates, such as 2,4- and 2,6-toluene diisocyanates, and 4,4'-, 2,4'-, and 2,2'-diphenylmethane diisocyanates; polymeric polyisocyanates, such as polyphenyl polymethylene polyisocyanates (polymeric MDI); and mixtures of these polyisocyanates.

Polyurethane foams according to the present invention may be prepared using any of the polyols known to be useful in the preparation of such foams. By polyol is meant a hydroxyl functional compound having two or more hydroxyl groups per molecule, preferably selected from the group consisting of diols, e.g., $C_2$–$C_5$ aliphatic diols, triols, tetrols and mixtures of such polyols. Classes of such polyols include, for example, polyhydric alcohols, polyester polyols, polyether polyols, oxyalkylene glycols and mixtures thereof. Specific examples of polyols include, for example, those described in columns 6 and 7 of U.S. Pat. No. 4,795,763, the disclosure of which is incorporated herein by reference. Preferred classes of polyols include: oxyalkylene glycols, such as diethylene glycol, dipropylene glycol, triethylene glycol, tripropylene glycol, tetraethylene glycol, tetrapropylene glycol, trimethylene glycol and tetramethylene glycol; polyether polyols, such as polyethylene oxides, polypropylene oxides, and ethylene oxide-propylene oxide copolymers; and polyester polyols, in particular aromatic polyester polyols and more particularly aromatic polyester polyols having phthalic acid residues therein.

Any of the catalysts known to be useful in the preparation of polyurethane and polyisocyanurate foams may be employed in the present invention. The choice of catalyst will depend in large part on the type of foam that is to be prepared, for example, trimerization catalysts are used in the preparation of polyisocyanurate foams, and urethane catalysts are used in the preparation of polyurethane foams. Many of the commonly used trimerization catalysts also function to catalyze the reaction of isocyanate and polyol to form urethane. Combinations of catalysts may also be employed. Examples of trimerization catalysts include, but are not limited to: metal carboxylates, such as sodium and potassium formates; tertiary amine trimerization catalysts, such as 1,3,5-tris(N,N-dimethylaminopropyl)-s-hexahydrotriazine, and ortho- and para- (dimethylaminomethyl) phenols; and quaternary ammonium carboxylates, such as N-hydroxyl-alkyl quaternary ammonium carboxylates. Examples of urethane catalysts include, but are not limited to: tertiary amines, such as triethyl amine, dimethyl ethanol amine, tetra(methyl)ethylenediamine and 1,4-diazadicyclooctane (2,2,2); and organo tin compounds, such as dibutyltin diacetate, stannous octoate and dibutyltin dilaurate.

Polyurethane foams according to the present invention may be prepared using any of the blowing or foaming agents known to be useful in such preparations. Classes of blowing agents include, for example, liquid compounds which boil at the temperatures and pressures under which the foam is formed, e.g., hydrocarbons, ethers, water, chlorofluorocarbons (CFC's), hydrochlorofluorocarbons (HCFC's), and hydrofluorocarbons (HFC's). Other classes of blowing agents include, for example, gases such as carbon dioxide and nitrogen, and organic compounds having moieties which can generate gases such as carbon dioxide, e.g., carbonate or carboxylate moieties. Specific examples of blowing or foaming agents include, for example, those described in columns 9 and 10 of U.S. Pat. No. 4,795,763, which are incorporated herein by reference. A preferred class of blowing agents are non-CFC blowing agents, e.g., HCFC's and HFC's. Examples of suitable HCFC's and HFC's include, but are not limited to, compounds represented by the formulae: $CHClF_2$, $CHF_2CF_3$, $CF_3CH_2F$, $CHF_2CH_3$, $CClF_2CH_3$, and $CHClFCF_3$.

Other additives known to be useful in the preparation of polyurethane foams may be added to the foam forming components. Such other additives include, for example, nonreactive and reactive'flame retardants, such as tris(2-chloroethyl)-phosphate, plasticizers, mold release agents, and antioxidants. The use of such additives in polyurethane foams are well known to those skilled in the art.

The present invention is more particularly described in the following examples, which are intended to be illustrative only, since numerous modifications and variations therein will be apparent to those skilled in the art. Unless otherwise specified, all parts and percentages are by weight.

EXAMPLE 1

This example describes the preparation of a siloxane-polyoxyalkylene copolymer surfactant useful in the practice of the present invention, using the following enumerated ingredients.

| Ingredients | Amount as indicated |
|---|---|
| Reaction 1 | |
| Hexamethyldisiloxane | 544 grams |
| Octamethyl cyclotetrasiloxane | 12,023 grams |
| polymethlyhydrogensiloxane | 1,534 grams |
| trifluoromethane sulfonic acid | 9.13 grams |
| Reaction 2 | |
| Allyl polyether[a] | 7136.1 grams |
| The product of Reaction 1 | 3506.4 grams |
| Chloroplatinic acid solution (7.5%) | 2 milliliters |

[a]Having a molecular weight of 800 and a ratio of ethoxy/propoxy groups of 75/25.

The ingredients for Reaction 1 were added, at ambient temperature, to a multi-necked round bottom glass flask equipped with a motorized stir blade, a nitrogen sweep, a temperature probe and heating mantle (both of which were connected to a temperature feed-back control device). The reaction mixture was heated to 70° C. with stirring under nitrogen and held at 70° C. for 6 hours. The reaction product was neutralized with sodium bicarbonate, filtered, heated to 150° C., sparged with nitrogen and stripped of volatiles under vacuum, yielding a clear silicone fluid precursor according to the nominal formula $MD_xD'_yM$, (wherein x=40, y=7.8, M is methyl, D is the dimethylsiloxy moiety, and D' is the methylhydrogensiloxy moiety). After cooling to room temperature, the silicon fluid precursor was transferred to an appropriate vessel.

The ingredients for Reaction 2 were added, at ambient temperature, to a multi-necked round bottom glass flask equipped with a motorized stir blade, a nitrogen sweep, a temperature probe and heating mantle (both of which were connected to a temperature feed-back control device). The contents of the flask were heated to and held at 80° C. for two hours with constant stirring under nitrogen. The contents of the flask were then heated to and held at 90° C. for another two hours, yielding a siloxane-polyoxyalkylene copolymer surfactant represented by the nominal formula, $MD_xD^*_yM$, (wherein M, D, x and y are as defined above, and $D^*$ represents the previous methylhydrogensiloxy moiety, D', the hydrogen of which has been replaced with the polyether pendent moiety). After cooling to room temperature, the contents of the flask were transferred to an appropriate container.

EXAMPLE 2

This is a comparative example describing the preparation of a mixture of precipitated silica and the siloxane-polyoxyalkylene copolymer surfactant of Example 1. Data covering the physical stability of the particulate dispersion described in this example is summarized in Table 1.

| Ingredients | Weight in grams |
|---|---|
| Hydrophobic Precipitated Silica[b] | 40 |
| Siloxane-polyoxyalkylene Surfactant of Example 1 | 360 |

[b]Prepared by hydrophobizing spray dried Hi-Sil ® 2000 silica with hexamethyldisilazane.

The particulate dispersion according to Example 2 was prepared in the following manner. The hydrophobic precipitated silica was micronized to a particle size of less than 2 microns, as determined with a Coulter LS particle size analyzer, using a 10.16 centimeter (cm) orbital Micron Master Jet Pulverizer available from the Jet Pulverizer Company. To a stainless steel vessel containing 360 grams of the siloxane-polyoxyalkylene copolymer surfactant of Example 1 at room temperature, 40 grams of the micronized hydrophobic precipitated silica was slowly added with agitation using an impeller blade operating at 3000 revolutions per minute (rpm). Following addition of the silica, the impeller blade speed was maintained at 3000 rpm until the mixture was observed to be thoroughly mixed, during which time the temperature did not exceed 30° C. The resulting particulate dispersion was then transferred to a suitable container.

EXAMPLE 3

This example describes the preparation of a particulate dispersion according to the present invention. Data covering the physical stability of the particulate dispersion described in this example is summarized in Table 1.

| Ingredients | Weight in grams |
|---|---|
| Component 1 | |
| Ethoxylated nonylphenol[c] | 1600 |
| Hydrophobic precipitated silica of Example 2 | 400 |
| Component 2 | |
| Siloxane-polyoxyalkylene copolymer surfactant of Example 1 | 3600 |

[c]Ethoxylated nonylphenol containing about 9.5 moles of ethylene oxide.

The particulate dispersion of Example 3 was prepared in the following manner. The ethoxylated nonylphenol of Component 1 was added to an appropriate stainless steel container equipped with a cowles stir blade at room temperature. With the cowles blade speed set at 2000 rpm, the hydrophobic precipitated silica was slowly added. Following addition of the hydrophobic precipitated silica, the speed of the cowles blade was increased to and held at 5000 rpm until the mixture was observed to be thoroughly mixed, during which time the temperature did not exceed 32° C. The contents of the stainless steel container were then transferred to a jacketed water cooled Premier mill which had been previously charged to 85% volume capacity with 1.1 to 5.5 mm diameter ceramic beads. The mixture of Component 1 was circulated through the mill, at a temperature that was not in excess of 55° C., until an average particle size of less than 2 microns was obtained, as determined using a Coulter LS particle size analyzer. Component 2 was added at room temperature to a suitable stainless steel vessel followed by the addition of 1200 grams of the milled Component 1 under agitation using an impeller blade operating at 2000 rpm, during which time the temperature of the contents of the vessel did not exceed 30° C. When thoroughly mixed, the resulting particulate dispersion was transferred to a suitable container.

TABLE 1

| | Results | |
|---|---|---|
| Test | Example 2 | Example 3 |
| Room Temperature Physical Stability[g] (Duration = 6 months) | Poor[d] | Good[e] |

[d]Settling[f] was observed after 7 days.
[e]No settling was observed after six months.
[f]Settling was determined in all instances by decanting the supernatant liquid and visually inspecting for any residue or sediments.
[g]The physical stability tests were performed by adding an equivalent amount of the dispersion of Example 2 and the dispersion of Example 3 separately to identical containers. The containers were then sealed and left undisturbed at room temperature. Daily inspections of the containers were conducted to determine if any settling had occurred.

The data of Table 1 shows that a stable particulate dispersion according to the present invention, as represented by Example 3, has better physical stability than the dispersion represented by Example 2.

EXAMPLE 4

This example describes the preparation of a rigid polyurethane foam from the reaction of polyisocyanate and polyol in the presence of a stable particulate dispersion according to the present invention as represented by Example 3, using the following enumerated ingredients.

| Ingredients | Amount In parts by weight |
|---|---|
| Polyol Component | |
| Polyether[h] | 100 |
| Deionized Water | 1.5 |
| Bis (dimethylaminopropyl) methyl amine[i] | 0.75 |
| Tetra (methyl) ethylenediamine | 0.75 |
| Stable Particulate Dispersion[j] | 2.0 |
| HCFC-141b | 30 |
| Isocyanate Component | |
| Polymeric MDI[k] | 129.6 |

[h]VORANOL 360 polyether having a hydroxyl number of 360, available from Dow Chemical Corporation.
[i]POLYCAT 77 catalyst available from Air Products & Chemicals Incorporated.
[j]Prepared by the procedure of Example 3.
[k]PAPI 27 polymeric MDI having an isocyanate equivalent weight of 31.5, available from Dow Chemical Corporation.

The ingredients of the polyol component were added to a stainless steel beaker and agitated with a motorized stir blade until thoroughly mixed. The isocyanate component was next added to the thoroughly mixed polyol component followed by mixing at 4000 rpm for 5 seconds. The combination of the polyol and isocyanate components was immediately added to a 36×36×7.6 centimeter (cm) mold in an amount sufficient to provide a 10% by weight overpacking of the mold. The mold was closed and held at a temperature of 49° C. for ten minutes, followed by demolding of the rigid polyurethane foam test sample. The resulting rigid polyurethane foam test sample was found to be of good quality, having the following physical properties: an overall density of 30.76 kilograms per cubic meter (kcm); a core density of 25.47 kcm; and an initial k-factor of 0.128. The overall and core densities were measured in accordance with ASTM D-1622-88. The initial k-factor was measured in accordance with ASTM C-518-85.

The present invention has been described with reference to specific details of particular embodiments thereof. It is not intended that such details be regarded as limitations upon the scope of the invention except insofar as and to the extent that they are included in the accompanying claims.

We claim:

1. A polyurethane or polyisocyanurate foamed product comprising a network of cell walls surrounding interstitial spaces wherein said network is formed from the reaction of a polyisocyanate and polyol in the presence of a stable particulate dispersion of:

(a) from 50% to 98.9% by weight, based on the total weight of said composition of a siloxane-polyoxyalkylene copolymer surfactant;

(b) from 1% to 49.9% by weight, based on the total weight of said composition, of a nonionic organic surfactant other than the surfactant of (a); and (c) from 0.1% to 25% by weight, based on the total weight of said composition, of a particulate material having a particle size of less than 20 microns.

2. The foamed composition of claim 1 wherein said nonionic organic surfactant is selected from at least one of the group consisting of alkoxylated alkylphenols, polyalkylene oxides, and alkoxylated allyl alcohols.

3. The foamed composition of claim 2 wherein said nonionic organic surfactant is an ethoxylated nonylphenol having from 1 to 30 ethoxy units.

4. The foamed composition of claim 1 wherein said particulate material is selected from the group consisting of fumed silica, precipitated silica, silica aerogel, and mixtures of such silicas.

5. The foamed composition of claim 4 wherein said particulate material is precipitated silica.

6. The foamed composition of claim 5 wherein said particulate material is hydrophobic precipitated silica having a particle size of less than 5 microns.

7. The foamed composition of claim 1 further comprising from 1% to 50% by weight, based on the weight of said nonionic organic surfactant, of a viscosity reducing agent, said composition having a viscosity of from 250 to 2500 centipoise.

8. The foamed composition of claim 7 wherein said viscosity reducing agent is selected from the group consisting of propylene carbonate, 2-methoxy ethyl ether, dipropylene glycol methyl ether, and mixtures thereof.

9. The foamed composition of claim 8 wherein said viscosity reducing agent is propylene carbonate.

10. The foamed composition of claim 1 wherein said siloxane-polyoxyalkylene copolymer surfactant is present in an amount of from 65% to 80% by weight, based on the total weight of said composition, and is represented by the following general formula,

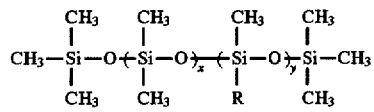

wherein x is from 13 to 42, y is from 7 to 10, and R is an alkyl alkoxylate represented by the following general formula,

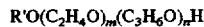

wherein R' is an alkylene group containing from 3 to 6 carbon atoms, m is from 5 to 200 and n is from 2 to 18; said nonionic organic surfactant is present in an amount of from 15% to 25% by weight, based on the total weight of said composition, and is an ethoxylated nonyl phenol having from 1 to 30 ethoxy units; and said particulate material is present in an amount of from 0.1% to 5% by weight, based on the total weight of said composition, and is hydrophobic precipitated silica having a particle size of less than 5 microns.

11. The foamed composition of claim 10 further comprising from 1 to 50 weight percent, based on the weight of said nonionic organic surfactant, of a viscosity reducing agent selected from the group consisting of propylene carbonate, 2-methoxy ethyl ether, dipropylene glycol methyl ether, and mixtures of such viscosity reducing agents.

* * * * *